E. T. TURNEY.
DAMPER MECHANISM FOR PLAYER PIANOS OR THE LIKE.
APPLICATION FILED DEC. 26, 1913.
1,125,217.
Patented Jan. 19, 1915.
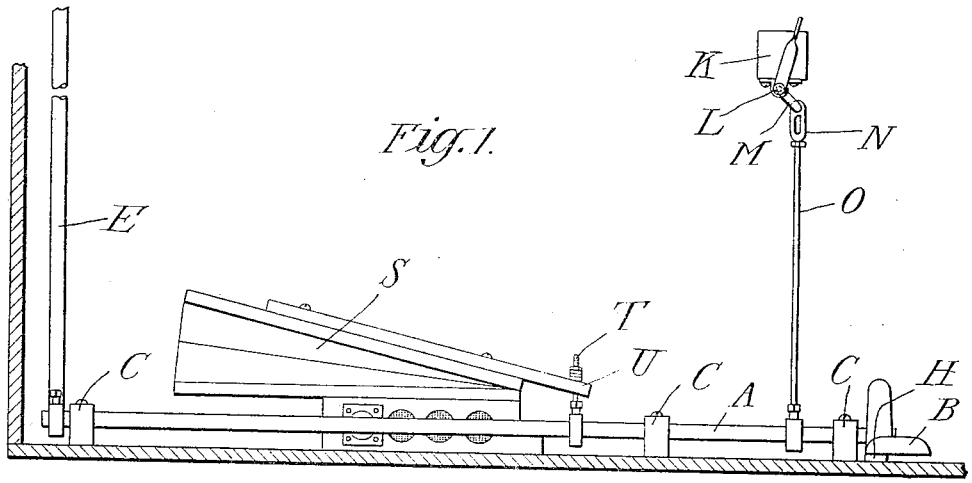
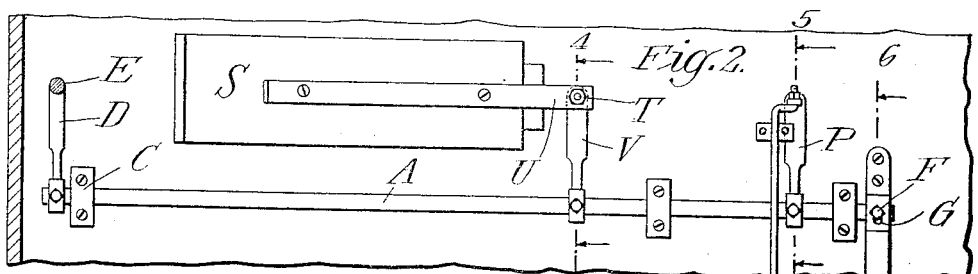
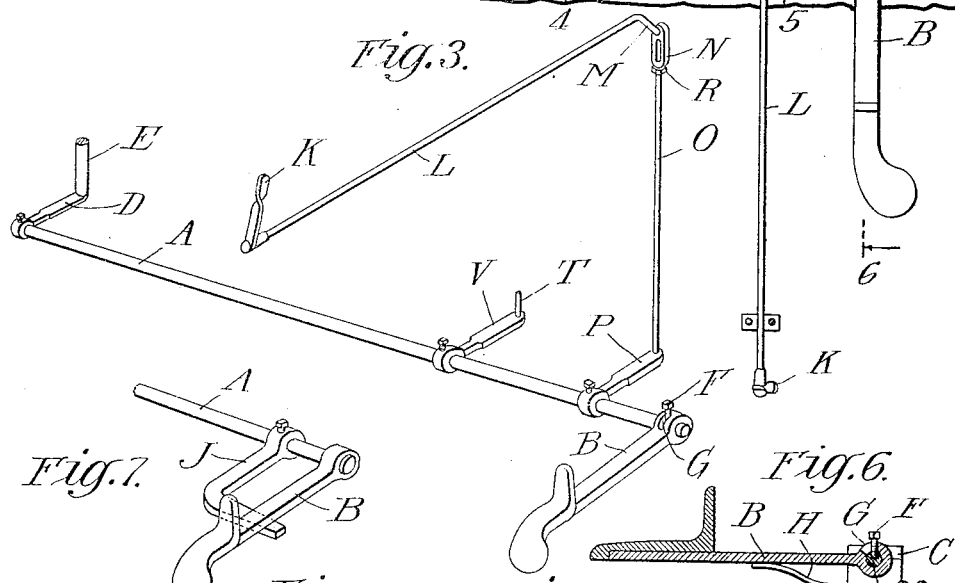
WITNESSES
INVENTOR
Eugene T. Turney
BY
D. Anthony Msina
ATTORNEY

UNITED STATES PATENT OFFICE.

EUGENE T. TURNEY, OF NEW YORK, N. Y., ASSIGNOR TO AMERICAN PLAYER ACTION COMPANY, A CORPORATION OF WEST VIRGINIA.

DAMPER MECHANISM FOR PLAYER-PIANOS OR THE LIKE.

1,125,217.   Specification of Letters Patent.   Patented Jan. 19, 1915.

Application filed December 26, 1913.   Serial No. 808,822.

*To all whom it may concern:*

Be it known that I, EUGENE T. TURNEY, a citizen of the United States, residing in the city, county, and State of New York, have invented certain new and useful Improvements in Damper Mechanism for Player-Pianos or the like, of which the following is a specification.

This invention aims to provide an improved mechanism for lifting the dampers of player pianos through simple connections which are compact and durable and easily operated.

In its preferred form the invention provides for the lifting of the dampers either by a pedal as usual or by hand or by an automatic device, these three controlling elements being so connected as to avoid interference with each other and to permit any one to be used for operating the damper without moving the others.

The accompanying drawings illustrate embodiments of the invention.

Figure 1 is a front elevation of a complete combination embodying the invention; Fig. 2 is a plan of the same; Fig. 3 is a perspective of the same omitting only the automatic mechanism; Fig. 4 is a sectional view on the line 4—4 of Fig. 2; Fig. 5 is a similar view on the line 5—5 of Fig. 2; Fig. 6 is a similar view on the line 6—6 of Fig. 2; Fig. 7 is a perspective view of a modified detail.

Referring to the embodiments of the invention illustrated I have shown only the pedal action, that is the damper shaft or pedal shaft and the devices for operating the same, the dampers themselves and the casing being omitted for the sake of clearness. The pedal shaft A runs from the usual loud pedal B at the center of the piano to the left hand end of the piano, being carried in bearings C mounted on the base of the piano. At its end the shaft carries a rearwardly projecting arm D which engages the lower end of a rod E which runs up to the ordinary arm for lifting the dampers as the rod E is lifted.

The pedal B is mounted on the shaft with a lost motion connection, such for example as the set screw F passing through an elongated slot G in the pedal. Normally the rear end of the slot engages the screw F so that upon pressing the pedal down the shaft A is turned. When the pedal is not pressed down, however, it is held in the position of Fig. 6 by means of a spring H bearing upon the base of the piano casing; and if the shaft A be turned forwardly the set screw F will move in the slot G without resistance from the pedal and without moving the pedal. An alternative form of lost motion for connecting the pedal to the shaft is shown in Fig. 7. Here the pedal B is loosely mounted on the shaft A and bears on the top of an arm J which is fixed on the shaft. When the pedal is depressed the shaft is turned through the arm J, but if the shaft be turned forward by any other means it turns loosely in the pedal.

At a point adjacent to the keyboard so that it can be operated by hand there is located a lever K mounted on the end of a shaft L extending from front toward the back of the machine to a distance slightly in the rear of the plane of the shaft A. On its rear end the transverse shaft L has an arm M connected through an adjusting nut N to a vertical link O which passes loosely through a hole in an arm P which is fixed on the damper shaft A. The link O has a nut Q on its lower end to form a stop and to permit a slight adjustment in length. The upper end of the link O screws into the nut N to permit a considerable adjustment, a set nut R being used to clamp the parts after adjustment. The passing of the link O through the arm P loosely provides for a certain amount of lost motion similar to that provided for in the pedal B. When the handle K is pushed to the left the transverse shaft L is rocked, the link O raised and the shaft A turned forward. If the handle K is in the inoperative position illustrated and the shaft A is turned forward by any other instrumentality the arm P swings up freely without moving the link O or the hand lever K.

Some players are provided with automatic mechanism for actuating the dampers by connecting a special pneumatic with the wind chest or suction chamber when the dampers are to be lifted. Such a pneumatic is illustrated at S and I propose to connect it to the shaft by means of a link T passing through an extension or arm U of the movable member of the pneumatic and extending at its lower end freely through an opening in an arm V which is fixed on the damper shaft. The rod or link T has a nut W on its lower end as shown in Fig. 4 so that when suction is admitted to the pneumatic to collapse the latter the shaft A is turned forward to lift the dampers. If the shaft A be operated by any other instrumentality, however, the arm V swings up freely over the link T without movement of the latter. Thus it will be seen that any one of the operating devices provided for may be used without the drag or resistance which would be encountered from the other operating devices if they were connected rigidly to the damper shaft. Various other styles of connection devised to work positively in one direction and loosely in the other may be substituted for those illustrated at any one or more of the connections. In fact, various modifications in detail and in the arrangement of the parts may be made by those skilled in the art without departure from the invention.

What I claim is—

1. A damper action for player pianos comprising in combination two damper operating devices each adapted to be operated without causing a movement of the other.

2. A damper action for player pianos comprising in combination a damper shaft and two operating devices therefor each loosely connected thereto so as to permit operation by either of said devices without movement of the other.

3. A damper action for player pianos comprising in combination a damper shaft, a pneumatic device, a hand device and a pedal, each of said devices and said pedal being loosely connected to said shaft so as to permit operation by any one without movement of the other two.

4. A damper action for player pianos comprising in combination a damper shaft and two operating devices therefor each loosely connected thereto so as to permit operation by either of said devices without movement of the other, one of said devices being pneumatic.

5. A damper action for player pianos comprising in combination a shaft running from the center to one end of the piano and adapted to engage a damper operating means at the end, a pedal engaging said shaft near the center of the piano and a hand lever connected to said shaft also near the center of the piano.

6. A damper action for player pianos comprising in combination a shaft running from the center to one end of the piano and adapted to engage a damper operating means at the end, a pedal engaging said shaft near the center of the piano and a hand lever connected to said shaft also near the center of the piano, said pedal and said hand lever being adapted to operate the shaft each without movement of the other.

7. A damper action for player pianos comprising in combination a damper shaft, a pedal for operating the same, an arm on said shaft extending to the rear, a link engaging the end of said arm and extending upward, a hand shaft extending transversely of the damper shaft and having its rear end in engagement with the upper end of said link and a hand lever for operating said hand shaft.

8. A damper action for player pianos comprising in combination a damper shaft, a pedal for operating the same, an arm on said shaft extending to the rear, a link engaging the end of said arm and extending upward, a hand shaft extending transversely of the damper shaft and having its rear end in engagement with the upper end of said link and a hand lever for operating said hand shaft, said pedal and hand lever being loosely connected so as to permit operation of the damper shaft thereby without permitting operation of the pedal and hand lever by the damper shaft.

9. A damper action for player pianos comprising in combination a damper shaft A, a pedal B loosely connected thereto and projecting forwardly therefrom, an arm P projecting rearwardly from said shaft, a hand lever K connected to said arm, an arm V also projecting rearwardly from said shaft, a pneumatic S connected to said arm V, lost motion being provided between said hand lever K and shaft A and also between said pneumatic S and shaft A so that said pneumatic, hand lever and pedal may each operate said shaft without movement of the other two.

In witness whereof, I have hereunto signed my name in the presence of two subscribing witnesses.

EUGENE T. TURNEY.

Witnesses:
D. ANTHONY USINA,
LULU STUBENVOLL.

Copies of this patent may be obtained for five cents each, by addressing the "Commissioner of Patents, Washington, D. C."